United States Patent
Duquesne et al.

(10) Patent No.: US 12,181,045 B2
(45) Date of Patent: Dec. 31, 2024

(54) BELTDRIVE TENSIONER FOR AGRICULTURAL EQUIPMENT

(71) Applicant: CNH Industrial Belgium N.V., Zedelgem (BE)

(72) Inventors: Frank Duquesne, Zwevegem (BE); Sam Reubens, Sint-Michiels (BE); Steven Titeca, Ghent (BE); Ruben Vancoillie, Roeselare (BE); Pieter Vandevelde, Sint Michiels Brugge (BE); Wim Syryn, Klerken (BE)

(73) Assignee: CNH Industrial Belgium N.V., Zedelgem (BE)

( * ) Notice: Subject to any disclaimer, the term of this patent is extended or adjusted under 35 U.S.C. 154(b) by 66 days.

(21) Appl. No.: 18/125,528

(22) Filed: Mar. 23, 2023

(65) Prior Publication Data
US 2023/0304564 A1    Sep. 28, 2023

(30) Foreign Application Priority Data
Mar. 23, 2022 (EP) ..................................... 22163948

(51) Int. Cl.
*F16H 7/08*    (2006.01)
*F02B 67/06*   (2006.01)

(52) U.S. Cl.
CPC ............... *F16H 7/08* (2013.01); *F02B 67/06* (2013.01); *F16H 2007/0806* (2013.01); *F16H 2007/0812* (2013.01); *F16H 2007/0823* (2013.01); *F16H 2007/0865* (2013.01)

(58) Field of Classification Search
CPC ...... F16H 7/08; F16H 2007/0806; F16H 7/18; F16H 2007/0812; F16H 2007/0823; F16H 2007/0865; F02B 67/06

USPC ......................................... 474/110, 134, 135
See application file for complete search history.

(56) References Cited

U.S. PATENT DOCUMENTS

| 4,511,348 A | 4/1985 | Witdoek et al. |
| 5,778,644 A * | 7/1998 | Keller .................. A01D 41/142 56/14.4 |
| 6,681,552 B2 * | 1/2004 | Nelson .................. A01F 15/085 56/11.2 |

(Continued)

FOREIGN PATENT DOCUMENTS

| EP | 0757190 A1 | 2/1997 |
| JP | 2017141922 A * | 8/2017 |

OTHER PUBLICATIONS

JP 2017141922 A Inour.e (Year: 2017).*
Extended European Search Report for EP Application No. 22163948.7 dated Sep. 13, 2022 (7 pages).

*Primary Examiner* — Michael R Mansen
*Assistant Examiner* — Juan J Campos, Jr.
(74) *Attorney, Agent, or Firm* — Peter K. Zacharias; Rebecca L. Henkel; Rickard K. DeMille

(57) ABSTRACT

A tensioner assembly for tensioning a belt including a moveable arm, a first tensioner pulley mounted to the moveable arm, and a second tensioner pulley mounted to the moveable arm. In a first position of the moveable arm corresponding to a forward drive configuration, the first tensioner pulley is positioned in contact with the belt while the second tensioner pulley is spaced apart from the belt. In a second position of the moveable arm corresponding to a reverse drive configuration, the second tensioner pulley is positioned in contact with the belt while the first tensioner pulley is spaced apart from the belt.

11 Claims, 7 Drawing Sheets

(56) References Cited

U.S. PATENT DOCUMENTS

| | | | | |
|---|---|---|---|---|
| 7,003,935 | B2* | 2/2006 | Nesheim | A01D 34/475 |
| | | | | 56/10.8 |
| 7,603,837 | B2* | 10/2009 | Ehrhart | A01D 34/283 |
| | | | | 56/208 |
| 9,750,194 | B2* | 9/2017 | Vandamme | A01F 15/0841 |
| 10,299,436 | B2* | 5/2019 | Bailliu | A01D 41/06 |
| 2004/0083699 | A1* | 5/2004 | Nesheim | A01D 34/475 |
| | | | | 56/10.8 |
| 2015/0126315 | A1* | 5/2015 | Farewell | B60K 25/02 |
| | | | | 474/110 |
| 2015/0247559 | A1* | 9/2015 | Graves | F16F 15/067 |
| | | | | 474/117 |
| 2017/0273243 | A1* | 9/2017 | Bailliu | A01D 41/142 |

\* cited by examiner

BELTDRIVE TENSIONER FOR AGRICULTURAL EQUIPMENT

FIELD OF THE INVENTION

The invention relates for beltdrive tensioners for agricultural equipment.

BACKGROUND OF THE INVENTION

Agricultural equipment, such as combines, are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of materials from the ground, and moves them towards the feeder. The feeder conveys the consolidated crop materials to a feed roll. The feed roll is a drum which removes stones from the crop material and accelerates the crop material into the threshing and separating system. The threshing and separating system separates the desirable crop from the remaining material.

The feed roll may be rotated in a forward direction during normal harvesting operation, as well as in a reverse direction for clearing an obstruction. When operating the feed roll in the reverse direction, the feed roll is preferably rotated at a relatively high torque for clearing the obstruction. A lower torque is comparatively required for rotating the feed roll in the forward direction during normal harvesting operation.

A drive belt is driven to rotate the feed roll in either direction. The drive belt may be connected indirectly to the feed roll via a pulley, for example, or that connection may be direct. To operate the feed roll at the higher torque during the reverse operation, it would be desirable to maintain the drive belt at a high tension in order to achieve the higher desired torque at the feed roll. And, to operate the feed roll at the lower torque during normal harvesting operation, it would be desirable to maintain the drive belt at a lower tension (comparatively speaking), in an effort to extend the life of the drive belt. Described herein is a system for adjusting the tension on the drive belt to compliment forward and reverse operations.

This description of the background is provided to assist with an understanding of the following explanations of exemplary embodiments, and is not an admission that any or all of this background information is necessarily prior art.

SUMMARY

In a first exemplary aspect, there is provided a belt drive system. The belt drive system comprises a first pulley defining a first pulley axis about which said first pulley can rotate; a belt wound at least partially about said first pulley; and a tensioner assembly that is configured for tensioning the belt. The tensioner assembly comprises a first tensioner pulley, a second tensioner pulley, and a moveable arm, wherein in a first position of the moveable arm corresponding to a forward drive configuration, the first tensioner pulley is positioned in contact with the belt while the second tensioner pulley is spaced apart from the belt, and in a second position of the moveable arm corresponding to a reverse drive configuration, the second tensioner pulley is positioned in contact with the belt while the first tensioner pulley is spaced apart from the belt.

In a second exemplary aspect, there is provided a tensioner assembly for tensioning a belt. The tensioner assembly comprises a moveable arm, a first tensioner pulley mounted to the moveable arm, and a second tensioner pulley mounted to the moveable arm. In a first position of the moveable arm corresponding to a forward drive configuration, the first tensioner pulley is positioned in contact with the belt while the second tensioner pulley is spaced apart from the belt. In a second position of the moveable arm corresponding to a reverse drive configuration, the second tensioner pulley is positioned in contact with the belt while the first tensioner pulley is spaced apart from the belt.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Figure 1:
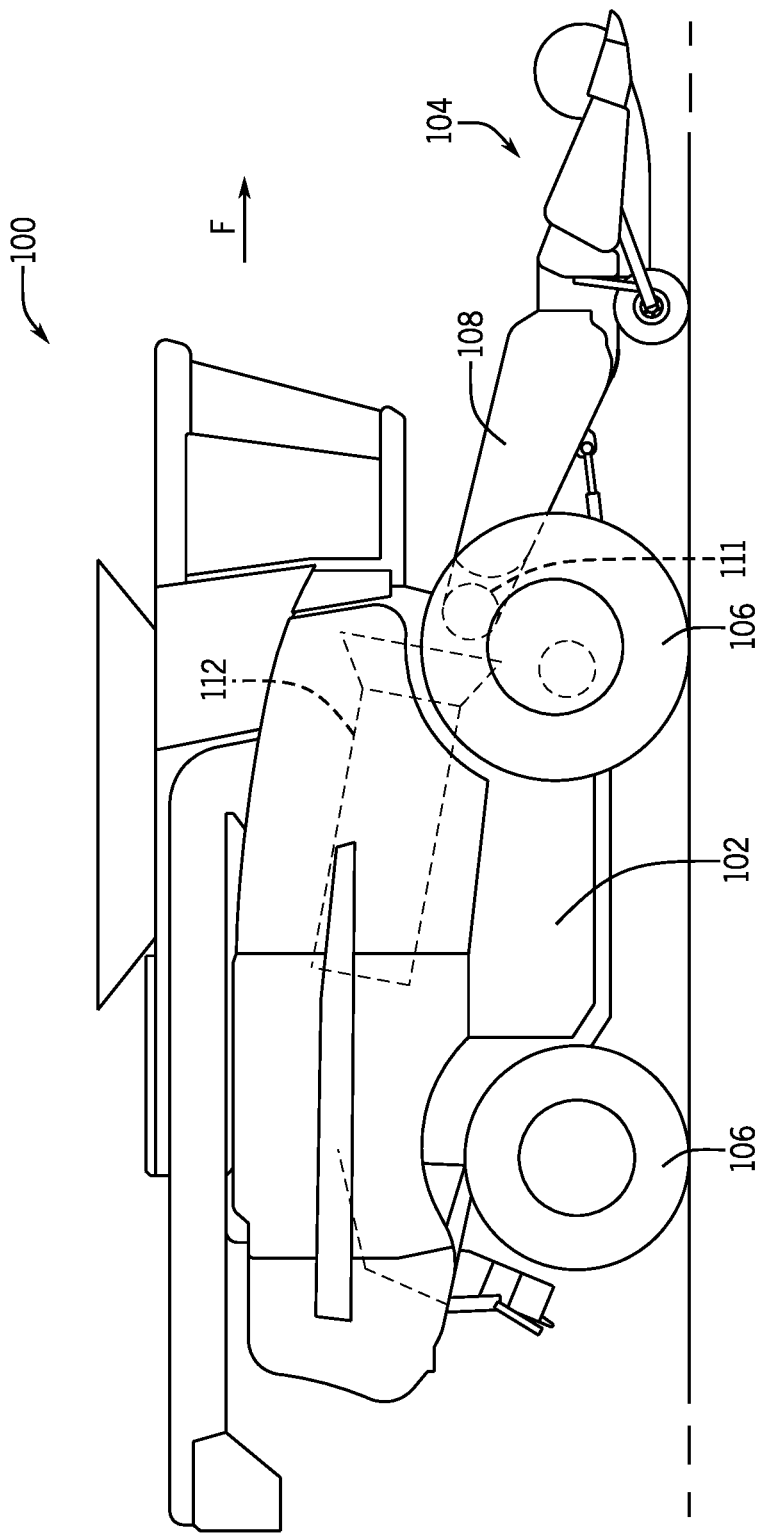
FIG. 1 illustrates an exemplary agricultural harvester.

In the figures, like reference numerals refer to the same or similar elements.

The terms "forward," "rearward," "left," and "right", when used in connection with the agricultural harvester (e.g. combine) and/or components thereof are usually determined with reference to the direction of forward operative travel of the combine, but they should not be construed as limiting. The terms "longitudinal" and "transverse" are determined with reference to the fore-and-aft direction of the agricultural combine and are also not to be construed as limiting.

The drawings depict one or more exemplary and non-limiting implementations in accordance with the present concepts. The examples are shown in conjunction with an agricultural combine harvester, but have applicability in any similar agricultural vehicle, such as a windrower or other equipment.

FIG. 1 shows an exemplary embodiment of an agricultural vehicle 100 in the form of a combine harvester. The vehicle 100 generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder assembly 108 (otherwise referred to in the art as a feeder or feederhouse). The feeder assembly 108 includes a conveyor configured to collect crop material and direct it to a transversely mounted feed roll 111 (also known in the art as a dynamic feed roll). The feed roll 111 is a drum which removes stones from the crop material and accelerates the crop material into the threshing and separating system 112 inside the vehicle 100.

The vehicle delivers power to feed roll 111 (i.e., rotates feed roll 111) by way of a belt drive system 400 (BDS 400). At the outset it should be understood that BDS 400 is not limited to powering feed roll 111. Also, BDS 400 is not limited for use with an agricultural vehicle. BDS 400 may be incorporated into any belt driven system that is capable of being driven in both a forward direction and a reverse direction.

Turning now to the features of BDS 400, and according to one exemplary embodiment shown herein, BDS 400 includes a lower pulley 402, an upper pulley 404, and a tensioner assembly 405 that are each mounted to the housing of vehicle 100. In this example, pulley 404 is the driving pulley whereas pulley 402 is the driven pulley. Lower pulley 402 includes a shaft and rotates with that shaft. The shaft of pulley 402 may be directly (or indirectly) connected to a shaft of feed roll 111 in a torque transmitting fashion. Upper pulley 404 includes a shaft 406 and rotates with that shaft 406. The shaft 406 of pulley 404 is (indirectly) connected (e.g., via a gearbox) to a rotating shaft in a torque transmitting fashion. According to one non-limiting aspect, that rotating shaft is the same shaft that drives the rotor of system 112. A belt 408 is wound about the pulleys 402 and 404.

Figure 2:
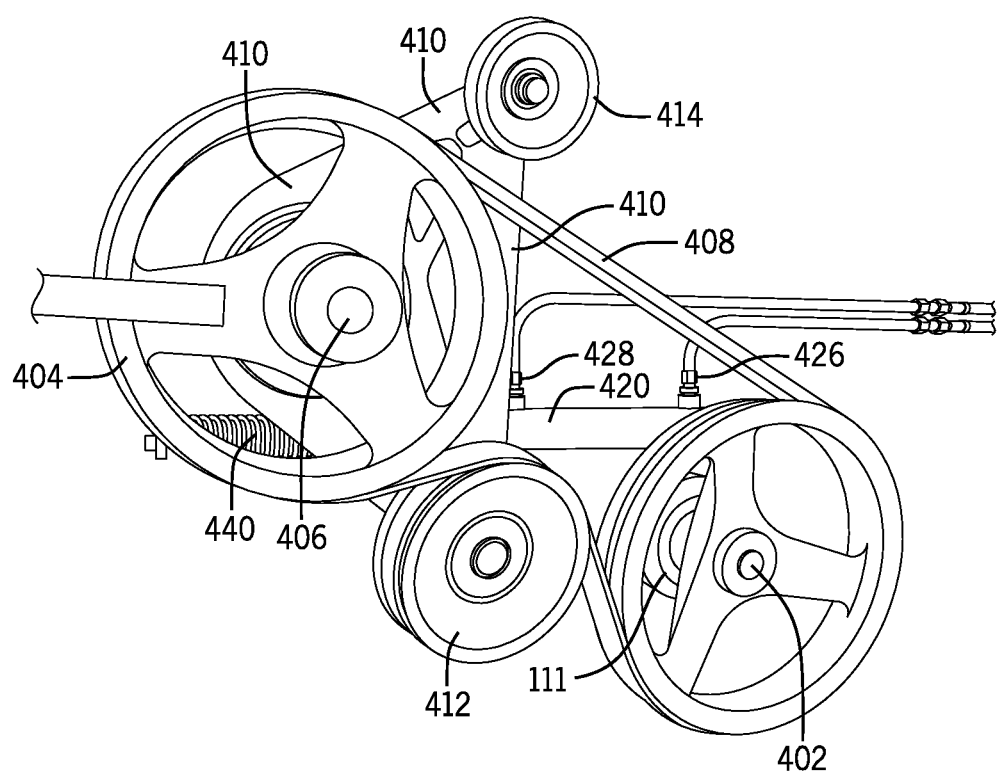
FIG. 2 is a front isometric view of a belt drive system (or assembly) for driving the feed roll of FIG. 1, wherein the belt drive system is shown in a forward drive configuration.
Figure 3:
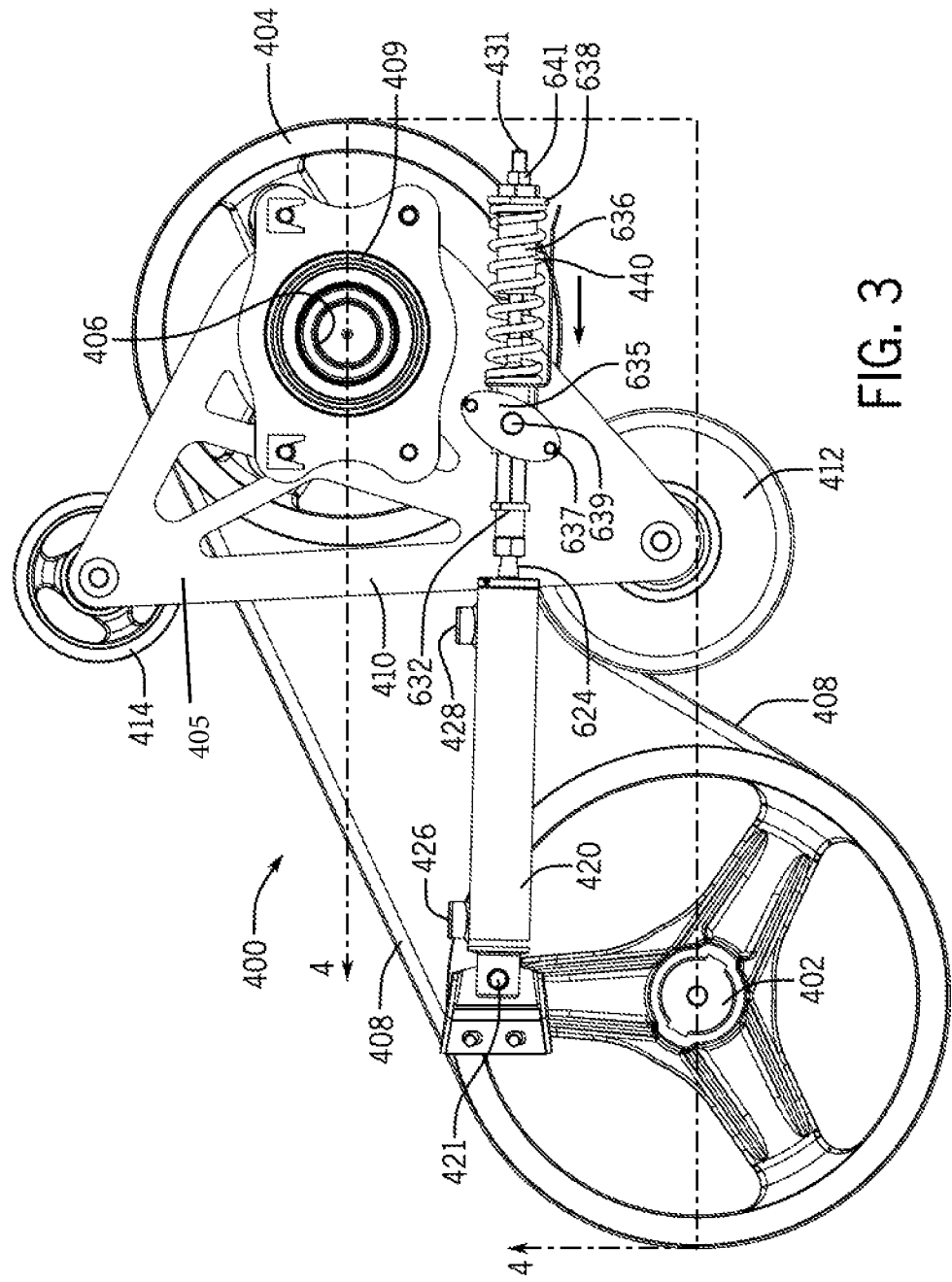
FIG. 3 is a rear elevation view of the belt drive system of FIG. 2 shown in a forward drive configuration.
Figure 4:
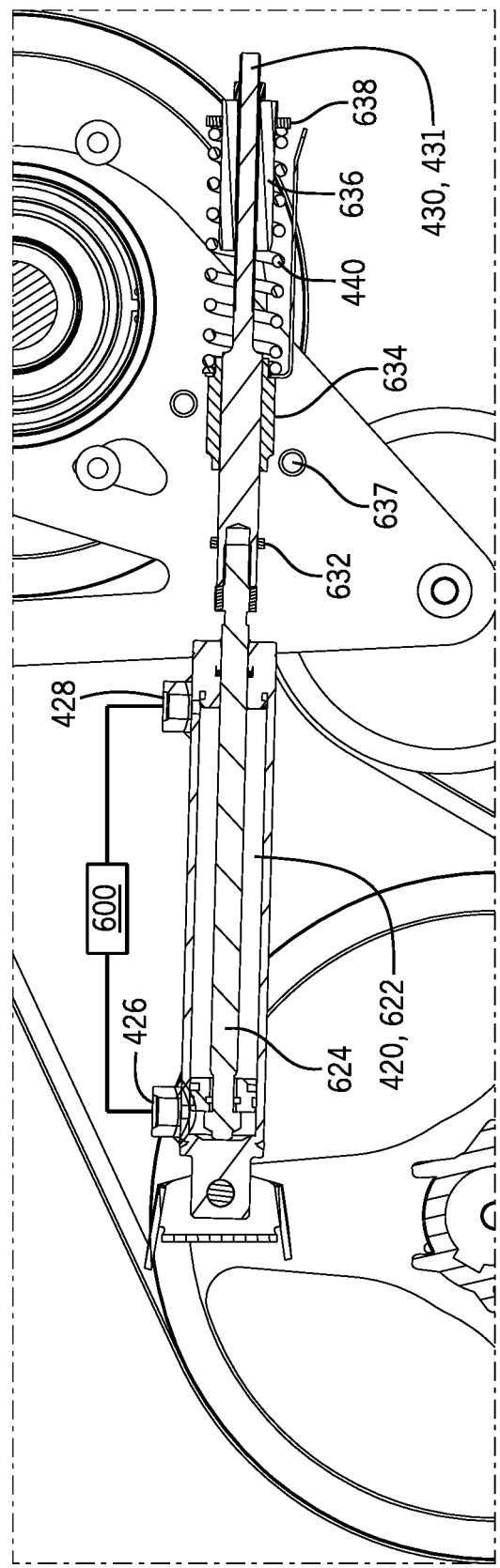
FIG. 4 is a detailed view of FIG. 3, wherein various components are cut-away to reveal internal details of the belt drive system.

As best viewed in FIGS. 2-4, the tensioner assembly 405 includes an arm 410 (or bracket) that is pivotably mounted to the shaft 406 of pulley 404 by a bearing 409. Thus, arm 410 is configured to rotate about the axis of shaft 406. It should be understood that arm 410 does not rotate along with shaft 406. Arm 410 is (optionally) a monolithic triangular shaped component. One side of the triangle is mounted about shaft 406, a forward operation tensioner pulley 412 is mounted to a second side of the triangle, and a reverse operation tensioner pulley 414 is mounted to the third side of the triangle. It should be understood that pulleys 412 and 414 are each capable of rotating relative to arm 410 about their respective axes. Pulleys 412 and 414 act on different portions of belt 408. Pulleys 412 and 414 may also be referred to in the art as tensioners or idlers.

Briefly, in the forward drive configuration of tensioner assembly 405 shown in FIG. 2, pulley 412 is pushed against the exterior slack side of belt 408 while pulley 414 is separated and spaced apart from belt 408. In the reverse drive configuration of tensioner assembly 405 shown in FIGS. 5-7, pulley 414 is pushed against the exterior slack side of belt 408 while pulley 412 is separated and spaced apart from belt 408.

Turning now to FIGS. 3 and 4, tensioner assembly 405 includes an actuator 420 having a hollow chamber 622; a piston 624 having a portion that is positioned within chamber 622 and another portion extending outside of chamber 622; a first fluid port 426 positioned at one side of actuator 420 and in fluid communication with one end of chamber 622; and a second fluid port 428 positioned at an opposite side of actuator 420 and in fluid communication with the opposite end of chamber 622. Hydraulic lines are connected to the fluid ports 426 and 428 for delivering fluid into chamber 622. Ports 426 and 428 are fluidly isolated by the seal of piston 624. The body of actuator 420 is mounted to a fixed point of vehicle 100 by a pin 421. Actuator 420 may or may not be configured to pivot about pin 421. In the forward drive configuration shown in FIG. 4, fluid is delivered through port 428 and into chamber 622 (or, alternatively, chamber 622 may be emptied of fluid) causing piston 624 (and its seal) to move to the left toward port 426. In the reverse drive configuration, fluid is delivered through port 426 and into chamber 622, causing piston 624 to move to the right and, thus, extend a greater distance outside of actuator 420.

Actuator 420 is not limited to being a hydraulic cylinder. Actuator 420 could be powered hydraulically (as described), pneumatically, electrically, mechanically, manually, and so forth. For example, actuator 420 may be an electric linear actuator, wherein the telescoping distance of the piston is metered and regulated by a controller.

The tensioner assembly 405 further includes additional components mounted to the end of piston 624. More particularly, the end of piston 624 extending outside of chamber 622 is fixedly connected to an elongated shaft 430. Shaft 430 may be considered as forming part of the piston 624. Shaft 430 has a first end that is fixed to piston 624, and a second free end 431 that is opposite the first end. An annular ring 632 is fixedly mounted to the exterior surface of shaft 430. An annular sleeve 634 is slideably mounted to shaft 430. Annular sleeve 634 is fixed to a bracket 635 by a pin 639 (or fastener). Pin 639 can permit rotation of bracket 635 relative to sleeve 634. Bracket 635 is also fixed to arm 410 by two fasteners 637. Accordingly bracket 635, sleeve 634 and arm 410 move together, and those components move relative to shaft 430.

An annular sleeve 636 is fixed (to a certain degree) to shaft 430. More particularly, as viewed in FIG. 3, spring 440 prevents sleeve 636 from moving to the left whereas a threaded nut 641 prevents sleeve 636 from moving to the right. Sleeve 636 is mounted closer to free end 431 of shaft 430 than sleeve 634. An annular ring 638 is mounted to the exterior surface of sleeve 636. A compression spring 440 is positioned between ring 638 and a shoulder that is formed on sleeve 634, and urges sleeve 634 toward ring 632.

In summary, the tensioner assembly 405 generally comprises items 410, 412, 414, 420, 430, 635, 440, 634 and 636.

As best shown in the forward drive configuration of FIG. 3, because sleeve 634 is fixed to arm 410 by fasteners 637 and 639, spring 440 also biases arm 410 (about its pivot point of shaft 406) in the direction of the arrow shown in FIG. 3. Accordingly, spring 440 also biases pulley 412 in the direction of the arrow against the slack side of belt 408. The tension applied by pulley 412 onto belt 408 is a function of the compression setting of spring 440, which can be adjusted via nut 641.

Figure 5:
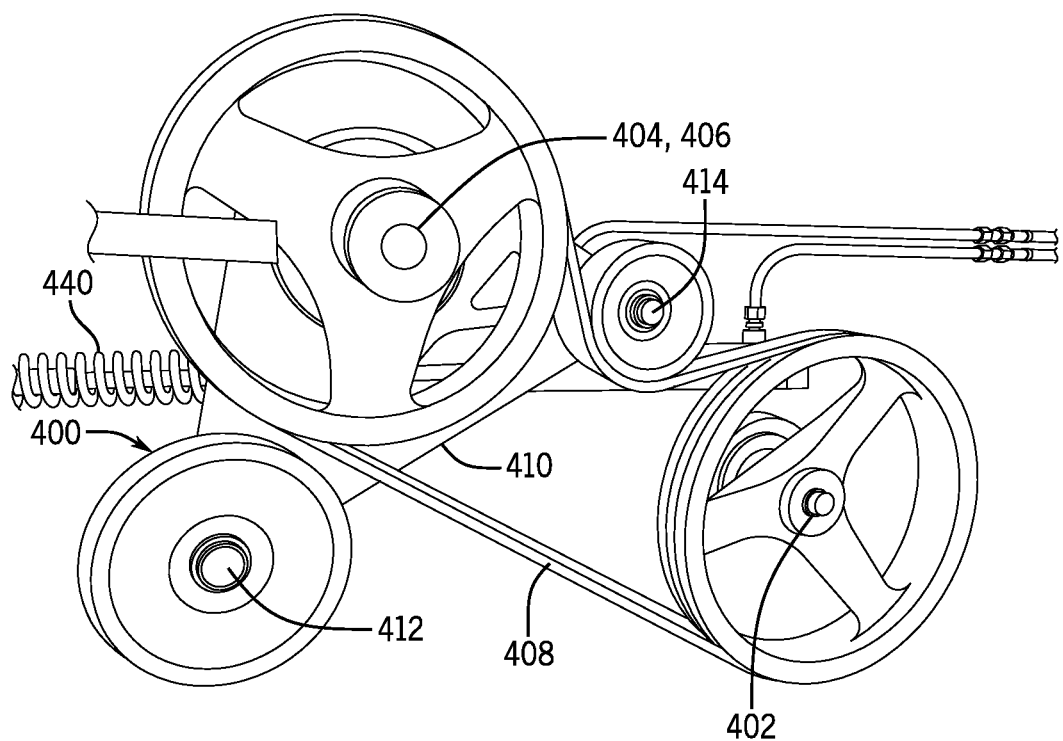
FIG. 5 is a front isometric view of the belt drive system of FIG. 2, wherein the belt drive system is shown in a reverse drive configuration.
Figure 6:
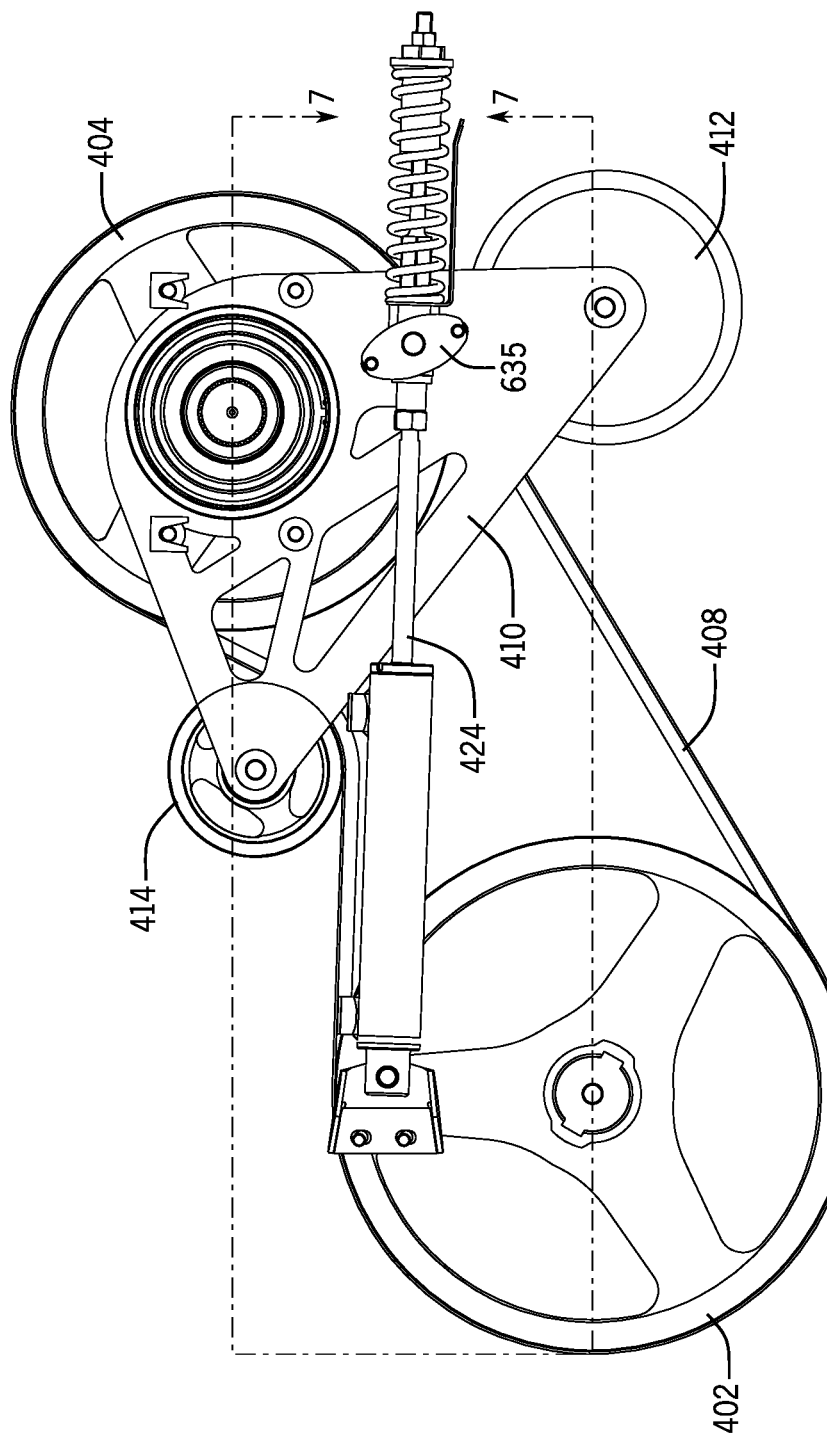
FIG. 6 is a rear elevation view of the belt drive system of FIG. 5 shown in a reverse drive configuration.
Figure 7:
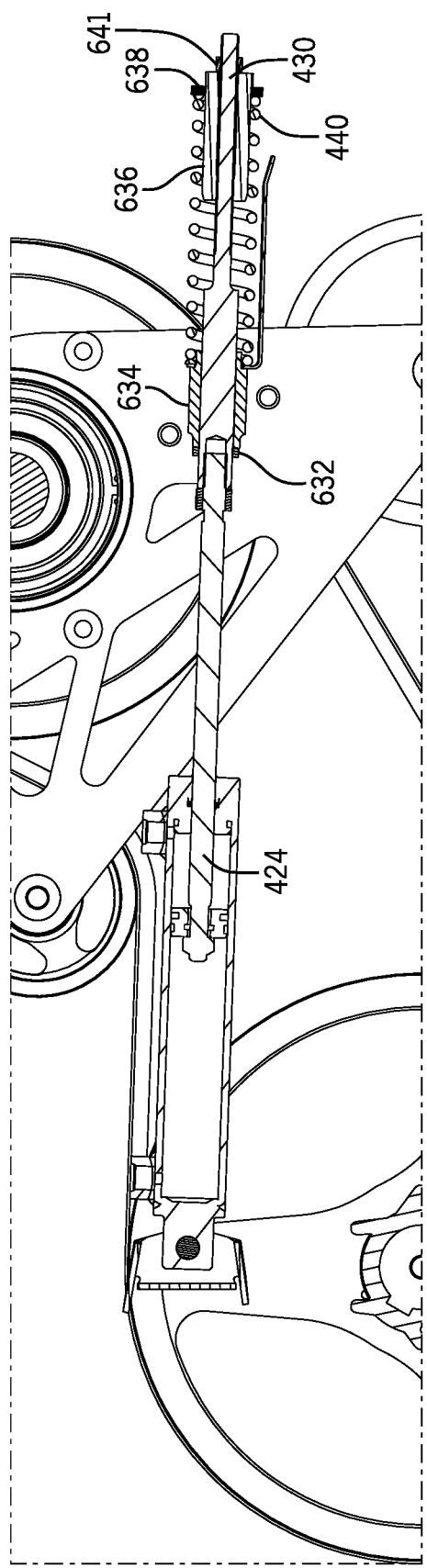
FIG. 7 is a detailed view of FIG. 6, wherein various components are cut-away to reveal internal details of the belt drive system.

To move the tensioner assembly 405 from the forward drive configuration of FIGS. 4-6 to the reverse drive configuration of FIGS. 5-7, fluid is delivered through port 426, thereby moving piston 624 (and its seal) to the right (as viewed in FIG. 4). Piston 624 and shaft 430 move together to the right. Ring 632 eventually contacts and bears on the end of sleeve 634 (see FIG. 7). Further movement of piston 624 causes ring 632 to translate sleeve 634, as well as arm 410 that is fixed to sleeve 634, thereby slightly compressing spring 440 against ring 638. Further movement of piston 624 causes arm 410 to pivot about the shaft 406. At such time, pulley 412 separates from belt 408, while pulley 414 comes into contact with belt 412. The tension applied by pulley 414 onto belt 408 is controlled by the position of piston 624, which is controlled by the internal hydraulic pressure of actuator 420. The internal pressure is adjustable by way of a control system. The diameter of the actuator cylinder may also be modified to meet a specific internal pressure requirement.

It should be understood that the pressure exerted by pulley 414 onto belt 408 under the influence of actuator 420 during the reverse drive configuration can be significantly greater than the pressure exerted by pulley 412 onto belt 408 under the influence of the spring 440 during the forward drive configuration. Higher tension is desired to achieve greater torque required to clear an obstruction in the feed roll as well. Increasing the pressure exerted by the pulley onto belt 408 during only the reverse drive configuration (and not the forward drive configuration) (i) extends the life of the belt, (ii) reduces the load on different components, and (iii) avoids belt slip during reversal.

It can be necessary to move tensioner assembly 405 from the forward drive configuration of FIGS. 2-4 to the reverse drive configuration of FIG. 5-7 (and back again) during a rocking or deslugging routine if an obstruction forms at the feed roll or feeder (or elsewhere).

A control unit 600 controls the amount of fluid delivered by a motor or pump into ports 426 and 428 for moving the tensioner assembly 405 between the forward drive configuration of FIGS. 2 and 3 and the reverse drive configuration of FIGS. 5 and 6. The lines connecting 600 and ports 426/428 may be fluid lines, for example. The control system 600 includes a controller, which is responsible for performing calculations and logic operations required to execute one or more computer programs or operations. It is to be understood that operational steps performed by the control system 600 may be performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A belt drive system comprising:
    a first pulley for rotating a shaft that is connected to the first pulley, the first pulley defining a first pulley axis about which the first pulley can rotate;
    a belt wound at least partially about the first pulley; and
    a tensioner assembly that is configured for tensioning the belt, the tensioner assembly comprising a first tensioner pulley, a second tensioner pulley, and a moveable arm,
    wherein in a first position of the moveable arm corresponding to a forward drive configuration, the first tensioner pulley is positioned in contact with the belt while the second tensioner pulley is spaced apart from the belt, and in a second position of the moveable arm corresponding to a reverse drive configuration, the second tensioner pulley is positioned in contact with the belt while the first tensioner pulley is spaced apart from the belt,
    wherein the belt drive system further comprises an actuator comprising (i) a cylinder mounted to a stationary point, and (ii) a piston that is connected to the moveable arm, wherein the movement of the piston causes movement of the arm between the first and second positions, and
    wherein the belt drive system further comprises a spring mounted to the piston, wherein one end of the spring bears on a fixed point on the piston, and an opposing end of the spring bears on the moveable arm for moving the moveable arm independently of the piston towards the first position.

2. The belt drive system of claim 1, wherein the belt drive system further comprises a second pulley, wherein the belt is wound at least partially about the first pulley and the second pulley, and wherein, in the forward drive configuration, the first pulley rotates in a first rotational direction, and in the reverse drive configuration, the first pulley rotates in a second rotational direction that is opposite the first rotational direction.

3. The belt drive system of claim 1, wherein the actuator is a hydraulic cylinder, a pneumatic cylinder, or an electric linear actuator.

4. The belt drive system of claim 1, wherein the belt drive system further comprises a control unit for regulating movement of the piston relative to the cylinder.

5. The belt drive system of claim 1, wherein the piston is configured to move between (i) a retracted position and (ii) an extended position in which the piston extends further from the cylinder as compared with the retracted position, wherein the retracted position corresponds to the forward drive configuration and the extended position corresponds to the reverse drive configuration.

6. The belt drive system of claim 1, wherein the piston is configured to move between (i) a retracted position and (ii) an extended position in which the piston extends further from the cylinder as compared with the retracted position, wherein the retracted position corresponds to the forward drive configuration and the extended position corresponds to the reverse drive configuration, and when the piston moves from the retracted position to the extended position the arm moves from the first position to the second position against a bias of the spring.

7. The belt drive system of claim 1, wherein the opposing end of the spring bears on a sleeve that is moveably mounted on the piston, and the sleeve is mounted to the arm.

8. The belt drive system of claim 1, wherein the moveable arm is positioned to rotate about the first pulley axis.

9. The belt drive system of claim 1, wherein the shaft is a shaft of a feed roll.

10. An agricultural vehicle comprising the belt drive system of claim 1.

11. The agricultural vehicle of claim 10, wherein the agricultural vehicle is a combine harvester.

* * * * *